United States Patent [19]

Tashiro et al.

[11] 4,028,611
[45] June 7, 1977

[54] VOLTAGE STABILIZING DEVICE OF A MAGNETO ALTERNATING CURRENT GENERATOR

[75] Inventors: Minoru Tashiro, Yokohama; Shigeru Kimura; Tokyo, both of Japan

[73] Assignee: Stanley Electric Co., Ltd., Tokyo, Japan

[22] Filed: Aug. 14, 1974

[21] Appl. No.: 497,225

[30] Foreign Application Priority Data
Aug. 17, 1973    Japan .................. 48-6656[U]

[52] U.S. Cl. .................. 323/8; 320/39; 323/22 SC; 323/39; 307/252 N
[51] Int. Cl.² .................. G05F 1/44
[58] Field of Search ......... 322/28; 323/7, 8, 22 SC, 323/18, 38, 39, 34–37, 22 Z; 307/252 K, 252 N; 320/39, 40

[56] References Cited
UNITED STATES PATENTS

| | | | |
|---|---|---|---|
| 3,341,763 | 9/1967 | Noddin | 320/39 |
| 3,355,650 | 11/1967 | Tolmie | 323/8 |
| 3,711,761 | 1/1973 | Watson | 323/22 SC |
| 3,757,199 | 9/1973 | Minks | 322/28 |
| 3,939,396 | 2/1976 | Larson | 323/8 |
| 3,997,833 | 12/1976 | Boyama | 323/39 |

FOREIGN PATENTS OR APPLICATIONS 2,114,758    3/1972    Germany .................. 323/22 Z

*Primary Examiner*—Gerald Goldberg
*Attorney, Agent, or Firm*—Flynn & Frishauf

[57] ABSTRACT

A voltage stabilizing device for a magneto alternating current generator for stabilizing and maintaining the alternating current output voltage at an effective value less than a certain predetermined level includes means for detecting the rising of the alternating current output voltage to a given reference voltage after rectification of the alternating output voltage of the magneto alternating current generator and means for phase controlling a controlled rectifier having a control electrode as a function of the difference between the raised output voltage and the reference voltage. The controlled rectifier is coupled across the output of the magneto alternating current generator.

14 Claims, 7 Drawing Figures

VOLTAGE STABILIZING DEVICE OF A MAGNETO ALTERNATING CURRENT GENERATOR

The present invention relates to a voltage stabilizing device for stabilizing the value of an alternating current output voltage generated from a magneto alternating current generator to a value below a predetermined value.

A magneto alternating current generator is used in many fields by incorporating same in motorbicycles, snowmobiles, portable power sources or the like. In general, such a magneto alternating current generator is used to energize an alternating current load and to recharge a battery. However, the generator has various problems in relation with voltage control thereof. That is, because the alternating current output voltage rises due to an increase in the rotation rate of the driving device, such as, for example, an engine, the generator may greatly exceed its rating voltage and thereby damage the rectifiers which convert the alternating current into a direct current. Also, the loads directly connected to the output of the generator may be damaged, and difficulties arise in connection with the recharging of the battery. Various voltage stabilizing devices have been studied and developed to solve the above mentioned problems and to design a system for the stabilization of the output voltage at a predetermined level.

In one of the prior art devices, a bridge circuit is constituted by resistors and a lamp to detect a voltage deviation of the bridge with an effective voltage of the lamp which is amplified by a transistor to trigger a gate of a silicon controlled rectifier, and the triggered silicon controlled rectifier then conducts to stabilize the alternating current output voltage of the generator. However, since the conducting of the silicon controlled rectifier in the prior art system is controlled by detecting directly the change of the alternating current effective value through the lamp, there is a defect in that maintenance of the system is difficult. That is, in this prior system, an irregular change of the stabilizing voltage at a control starting time causes a flickering of the load, for example, the lamp. Further, the stabilizing voltage is greatly changed by the load and a break in the filament of the detecting lamp may occur, thereby leading to failure of the system.

In another prior art device, the alternating current output voltage of the generator is stabilized using a photocoupler comprising a lamp and a CdS cell. In this system, the conducting of the silicon controlled rectifier is controlled by detecting the change of the alternating current output voltage through the lamp in which a luminous intensity changes according to the effective value of the alternating current voltage passing therethrough. However, in this prior device there are some defects, such as a wrong time response in relation with the CdS cell used in the photo-coupler, difficult maintenance occurring from broken wires or filaments of the photo-coupler, thermal damage of the CdS cell being located close to the lamp, or the like.

SUMMARY OF THE INVENTION

A main object of the present invention is to provide a voltage stabilizing device for a magneto alternating current generator which always maintains an effective output voltage value below a certain level without any substantial changing of the stabilizing voltage supplied to the load.

Another object of the present invention is to provide a voltage stabilizing device for a magneto alternating current generator in which it is possible to securely retain the voltage at substantially the desired effective value without being influenced by sudden changes of the load condition.

A further object of the present invention is to provide a voltage stabilizing device which allows a secure control of the generator output voltage notwithstanding a simple structure thereof.

According to the present invention, a voltage stabilization device for a magneto alternating current generator which is connectable to an alternating current load and a battery through a rectifier, comprises a controlled rectifier connected in parallel to said alternating current generator, a full wave rectifier circuit connected in parallel to said alternating current generator, and a gate control circuit means for phase controlling the controlled rectifier, the gate control circuit means including means for comparing an output voltage of the full wave rectifier circuit with a reference voltage and for feeding a trigger signal to a control gate of the controlled rectifier at a point in time corresponding to the difference between the compared voltages.

According to another aspect of the invention, a stabilization device comprises a controlled rectifier connected in parallel to a magneto alternating current generator and a gate control circuit connected between the control electrode of the controlled rectifier and one of the anode and cathode of the controlled rectifier. The gate control circuit includes rectifier means for rectifying an alternating current voltage produced by the magneto alternating current generator, a detecting portion for producing a control voltage signal corresponding to a difference between the rectified voltage and a reference voltage when the alternating current voltage becomes larger than a predetermined value by comparing the rectified voltage output of the rectifier with the reference voltage, and an amplifying portion responsive to the control voltage signal for applying a trigger signal to the control electrode of the controlled rectifier, thereby phase controlling a conducting condition of the controlled rectifier and stabilizing the output voltage applied to a load device which utilizes the alternatng current output voltage of the magneto alternating current generator.

In summary, the device according to the present invention is adapted to compare an alternating current output voltage of the magneto alternating generator with a reference voltage after rectification in order to detect the rising of the alternating current output voltage, and accordingly, the effective value of the stabilized alternating current voltage of the generator may be constantly kept always below a predetermined level.

DETAILED DESCRIPTION OF ILLUSTRATED EMBODIMENTS

Figure 1:
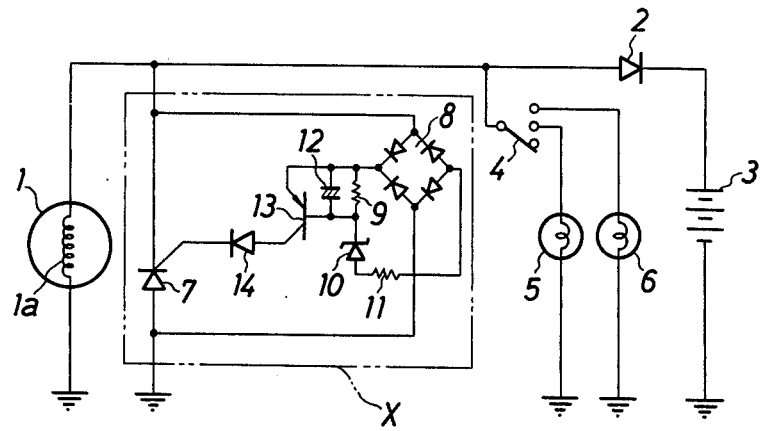
FIG. 1 is a circuit diagram of a voltage stabilizing device used in a magneto alternating current generator showing one embodiment according to the invention.

Referring to FIG. 1, a magneto alternating current generator 1 with an armature coil 1a is connected in series with a rectifier 2 and a battery 3. The armature coil 1a is connected in parallel with loads 5 and 6 through a load switch 4. The loads are, for example, lamps or the like which are adapted to receive the output of the generator 1, one load 5 being a heavy load and the other load 6 being a light load.

A voltage stabilizing device X is coupled to the output circuit of generator 1. A rectifier 7 with control electrode (i.e., an SCR or thyristor) is included in the stabilizing device X and is connected in parallel to the armature coil 1a, the polarity of the controlled rectifier 7 being such that the cathode thereof is connected to the positive terminal of the battery 3 through the intermediary of a rectifier 2 or directly (when the positive terminal is grounded).

The stabilizing device X also includes a rectifier circuit means 8 which comprises, for example, four diodes in a bridge connection, the input of the rectifier circuit 8 being connected to the armature coil 1a to effect full wave rectification of the output of the generator 1. Between the output terminals of the rectifier circuit means 8 is connected a series circuit comprising a resistance 9, a Zener diode 10 and a resistance 11. A capacitor 12 is connected in parallel to the resistance 9 and one end (the end connected to the "+" side of the output end of the rectifier circuit 8) of the capacitor 12 is connected to an emitter of a transistor 13. The collector of the transistor 13 is connected to a gate of the controlled rectifier 7 through the intermediary of a diode 14 for preventing reverse current flow. The output voltage from the rectifier circuit 8 is compared with a reference voltage (a Zener voltage of the Zener diode 10) and a trigger signal is applied to the gate of the controlled rectifier 7 through the transistor 13, according to a charging speed of the capacitor 12 based on an excessive voltage from the comparison. This also provides phase control of the controlled rectifier 7.

In operation of the above-described device, the load switch 4 is connected to the load 5 and where the battery 3 is normally connected, the output of the alternating current generator 1 is supplied to the load 5 through the switch 4 and charges the battery 3 after rectification by the rectifier 2. At the same time, the output of the generator 1 is converted into a direct current by the full wave rectification in the bridge rectifier circuit 8. The converted direct current is applied to the Zener diode 10 through the resistances 9 and 11 to be compared with the reference voltage (Zener voltage). When the converted direct current voltage exceeds the reference voltage the Zener diode 10 becomes conductive to allow the capacitor 12 to be charged at a rate corresponding to the deviation of the capacitor voltage from its charging voltage. The transistor 13 becomes conductive responsive to the charging of capacitor 12 so that the trigger signal is applied to the gate of the controlled rectifier 7 to render controlled rectifier 7 conducting. During this time, the operational wave from of the circuit will become as shown by the heavy solid line in FIG. 2. If the polarity of the output from the generator 1 is reversed after the controlled rectifier 7 has become conductive at a point $b_1$ in FIG. 2, the controlled rectifier 7 is turned off and at the same time the power is supplied to the load 5 and the battery 3.

When the load condition is switched to the light load the output voltage of the generator 1 is increased and thereby causes a large deviation of the output of rectifier circuit 8 relative to the reference voltage. Since the charging speed of the capacitor 12 is increased, the generated trigger signal will be such as to cause an enlarged conducting angle of the controlled rectifier 7. For example, the controlled rectifier 7 will now conduct at a point $b'_1$ shown in FIG. 2. Namely, the controlled rectifier 7 is phase controlled and the effective value of the output voltage from the alternating current generator 1 will thereby be controlled. Further, the control point (i.e., points $b_1$, $b'_1$) is also changed by the charging condition of the battery 3. There is also considered a non-connecting condition of the battery 3, as in an abnormal condition of the load. However, in this case, the wave form of the output voltage from the generator 1 is a sine wave even at the + side of the bridge rectifier circuit 8 as shown by the dotted line in FIG. 2. Because the voltage portion in this half cycle appears sharply at the output of the bridge rectifier circuit 8, the trigger signal is so applied that the charge of the capacitor 12 remains as a deviation relative to the reference voltage (the Zener voltage) to make an enlarged conducting angle of the controlled rectifier 7. Therefore, an increased part which appears in a half cycle of the non-controlling side of the wave form is cut off and the power is supplied to the load with the desired effective value.

Since the armature coil 1a of the generator 1 is directly shorted by the controlled rectifier 7 so as to control the alternating current output voltage, the continuous control which involves the voltage control effect remains under the influence of a counter electromotive occurring from short-circuit current of the armature coil 1a in the rise portion of the other half cycle which is not directly controlled. The influence of the continuous control will be larger as the conducting angle of the controlled rectifier 7 becomes larger. In other words, the influence of the control is larger as the difference that exists between the alternating current output voltage and the reference voltage becomes larger, and as a result, because its controlled variable becomes large, the charging voltage control of the battery 3 results from the charge of the latter at one half cycle being not directly controlled. This operation is explained by FIG. 2. In this case, it is so considered that the load switch 4 is open and that the loads 5, 6 are in the non-connected condition as illustrated in FIG. 1

Figure 2:
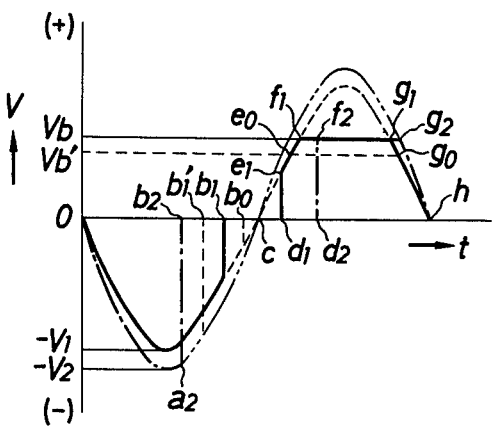
FIG. 2 illustrates a wave form explaining an operational state of the embodiment shown in FIG. 1.

Referring to FIG. 2, with a lower voltage (voltage $Vb'$) of the battery 3, its wave form is in a form of $o - a_1 - a_0 - b_0 - c - e_0 - g_0 - h$ and since the conducting angle of the controlled rectifier 7 is small, the battery 3 is fully charged without receiving the influence of the continuous control. However, with a higher voltage (voltage $Bb$) of the battery 3, its wave form is in a form of $o - a_1 - b_1 - c - d_1 - e_1 - e_0 - f_1 - g_1 - g_0 - h$ and the influence of the continuous control appears merely since the conducting angle of the controlled rectifier 7 is large as shown by the character $b_1 - c$. Further, the output voltage of the alternating current generator 1 becomes high when the rotation rate thereof is increased and the conducting angle of the controlled rectifier 7 becomes even larger as shown by the characters $b_2 - c$ when the voltage changes from $v_1$ to $v_2$. Accordingly, the influence of the continuous control becomes large and at the same time, the charging voltage of the battery 3 is controlled indirectly.

Figure 3:
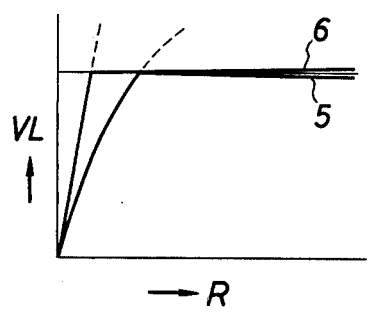
FIGS. 3 and 4 are graphical views showing voltage characteristics when using the embodiment shown in FIG. 1.
Figure 4:
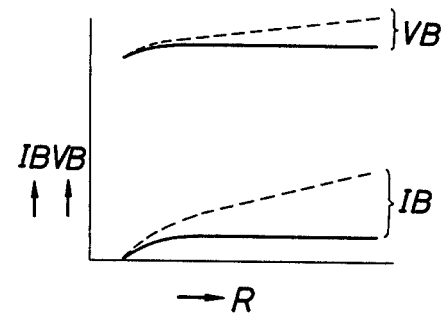

FIG. 3 shows a voltage characteristic curve of the load voltage (VL) at the loads 5 and 6 in FIG. 1 as a function of the rotation rate (R) — i.e., in RPM's — of the generator 1. In FIG. 3, the dotted line shows the case wherein voltage control is not practiced. FIG. 4 shows a charging characteristic curve of the battery 3 shown in FIG. 1 and further, FIG. 4 shows the respective relation of the rotation rate (R), the charging current (IB) and the charging voltage (VB), wherein the dotted line shows the case wherein voltage control is not practiced. It will be understood by both voltage characteristic views that the voltage control of the effective value of output voltage is precisely effected in the alternating current load and also that the control of the charging current and voltage is precisely effected in the battery load at the direct current output side.

Figure 5:
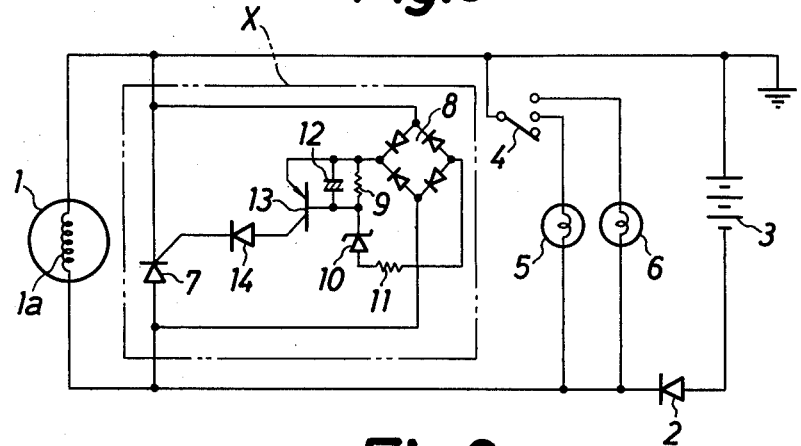
FIG. 5 is a circuit diagram showing another embodiment of a voltage stabilizing device according to the invention.

In the FIG. 1 embodiment, the battery 3 was grounded at the — side. However, as should be apparent, the battery 3 may be grounded at the + side. In this case, the rectifier 2 is connected to the — side of the battery 3 as shown in FIG. 5. Also, the emitter of the transistor 13 is illustrated as being directly connected to the capacitor 12, but a suitable resistance may be connected in series with the emitter. In such a connection, the operation will be similar to the above-described embodiment.

Figure 6:
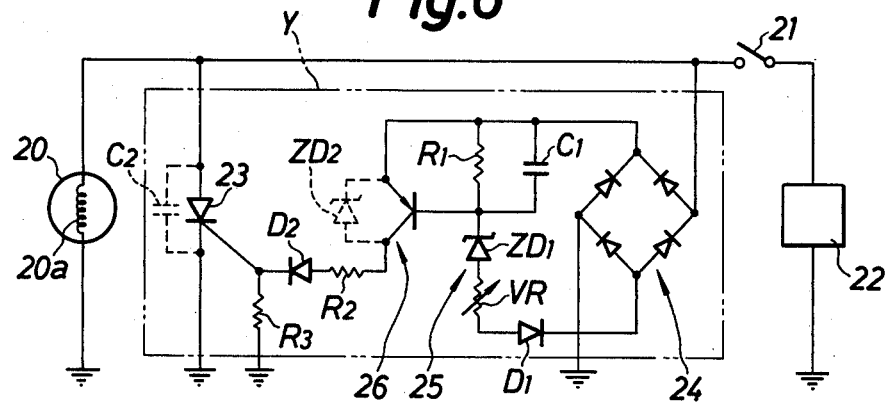
FIG. 6 is a circuit diagram showing a further embodiment according to the invention.

FIG. 6 illustrates another embodiment of the invention wherein a voltage stabilizing device Y is connected to a circuit wherein the load 22 is connected to magneto alternating current generator 20 having an armature coil 20a, through the intermediary of a load switch 21. The voltage stabilizing device Y comprises a silicon controlled rectifier 23 (SCR) connected in parallel to the armature coil 20a, a bridge rectifier circuit means 24 for converting the alternating current output voltage produced by the alternating current generator 20 into a direct current voltage, a detector means 25 for producing a control voltage signal corresponding to the difference between the rectified voltage and a reference voltage when the alternating current output voltage exceeds a predetermined value by comparing the rectified direct current voltage with the reference voltage, and an amplifier means 26 for amplifying the above mentioned control voltage signal and applying the amplified control voltage signal to the control electrode of the silicon controlled rectifier 23.

In the FIG. 6 embodiment, the rectifier circuit 24 is a full wave rectifier which, for example, includes four diodes coupled together to form a bridge circuit. A series circuit comprising a determining and detecting portion 25 for the reference voltage and a diode $D_1$ for preventing a reverse current flow is connected to the output of the bridge rectifier circuit 24. The determining and detecting portion 25 includes a resistor $R_1$, a Zener diode $ZD_1$ and a variable resistor VR. Connected across the ends of the resistor $R_1$ of the detecting portion 25 is an emitter-base junction of a transistor constituting an amplifier 26. A capacitor $C_1$ is also connected across resistor $R_1$ for eliminating ripple from the voltage flowing in the base-emitter path of the transistor. The collector of the transistor, which is an output of the amplifier 26, is connected to the gate of the controlled rectifier 23 through the intermediary of a resistor $R_2$ and a diode $D_2$ for protecting the gate from an inverse voltage. The gate of controlled rectifier 23 is grounded through a resistor $R_3$. Further, a second Zener diode or a constant voltage element $ZD_2$ may be connected between the emitter and collector of the transistor for protecting the transistor from damage due to inverse voltages. Further, a capacitor $C_2$ may be connected in parallel to the controlled rectifier 23 for protecting the controlled rectifier 23 from a surge voltage of the generator 20.

The following is an explanation of the operation of the circuit of FIG. 6. The alternating current voltage produced from the alternating current generator 20 is converted into a direct current voltage by effecting full wave rectification by means of the bridge rectifier circuit 24. The converted direct current voltage is compared with the reference voltage at the detecting portion 25 and when exceeding the value of the reference voltage, the deviation from the reference voltage is amplified at the amplifier 26 so as to apply a control voltage to the gate of the controlled rectifier 23, whereby a phase control is effected. This phase control varied so as to maintain the output voltage constant. That is, a direct current voltage circuit is formed by the detecting portion 25 and the amplifier 26. Herein, the voltage deviation is detected by the Zener diode $ZD_1$, and the transistor performs the amplification of the control signal. When the output voltage of the alternating current generator 20 is normal, the base potential of the transistor of the amplifier 26 is substantially equal to the emitter potential since the direct current voltage is smaller than the Zener voltage of diode $ZD_1$ and a control signal is not applied to the gate of the controlled rectifier 23. If the rotation rate (i.e., RPM's) of the alternating current generator 20 rises and the output voltage increases to a value greater than a given voltage Vs, the rectified direct current voltage also increases, thereby causing the Zener diode $ZD_1$ to conduct. Therefore, a forward voltage is applied between the terminals of the resistor $R_1$, that is, between the emitter and base of the transistor and then the transistor becomes in its ON condition. By this operation, the trigger or amplified control signal is fed to the gate of the controlled rectifier 23 so as to operate it, whereby voltage control is effected.

Figure 7:
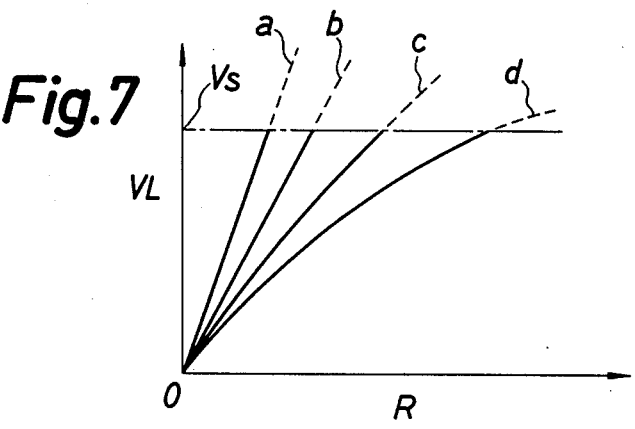
FIG. 7 illustrates the voltage characteristics of the embodiment of FIG. 6.

According to the voltage stabilizing device of FIG. 6, a load effective voltage VL is normally retained below a given voltage Vs for all normal rotation rates of the generator 20, as should be apparent from the graph shown in FIG. 7, since curves $a$ to $d$ which show the load effective voltage for different loads are cut off at points higher than the given voltage Vs.

As described above, a voltage stabilizing device for a magneto current generator according to the present invention has a wide range of control and the alternating current output voltage can be always retained constantly below a given level, since the alternating current output is compared with the reference voltage after rectification so as to detect the rising of the alternating current output voltage. Then, the controlled rectifier is accordingly phase controlled. The device according to the invention, further, has the following advantages.

1. Since the device connects the controlled rectifier (i.e., the SCR or thyristor) in parallel to the armature coil of the generator, it may continuously control the other half cycle which is not directly controlled. Therefore, the device controls the output of the alternating current generator by controlling a half cycle not providing the battery charging and at the same time it may prevent excessive charging of the battery.

2. Since the device performs full wave rectification of the alternating current output, detects the means value of the voltage and accordingly controls the controlled rectifier, the alternating current output is controlled to the desired value if the load (battery) is removed from the direct current output.

3. Since the device is phase controlled, it is possible to better control the effective value of the voltage at the alternating current output side.

4. The circuitry of the device is simple and suitable for solid-state construction, thereby making it easy to handle and more reliable over long periods of time.

5. By the detection of the means value of the voltage, the voltage value is properly detected even when the battery charging is not directly controlled and a proper charging control is effected under the charging condition of the battery. That is, the charging current is large when there is excessive discharge, and is small when under the full charging condition.

6. Since the voltage deviation is detected from the direct current, the device prevents excessive voltages from being applied to the battery when it is connected as a load and at the same time can eliminate flickering of the load (lamp) upon controlling of the controlled rectifier.

7. Since the device can detect a proper voltage deviation, it reduces any change in voltage due to changes in the load and eliminates the time delay with the variation of rotation rates of the generator.

While the foregoing is a description of preferred embodiments of the invention, various changes and modifications may be made thereto without departing from the spirit and scope of the invention concept as defined in the appended claims.

What is claimed is:

1. A voltage stabilizing device for a magneto alternating current generator (1) which is connectable to an alternating current load (5, 6) and which is further connectable to a battery (3) through a rectifier (2), comprising:
a controlled rectifier means (7), having a control electrode, connected directly in parallel with said alternating current generator (1);
a full wave rectifier circuit means (8) connected in parallel with said alternating current generator (1) and in parallel with said controlled rectifier means (7); and
a gate control circuit means coupled to an output of said full wave rectifier circuit means (8) and to said control electrode of said controlled rectifier (7) for phase controlling said controlled rectifier, said gate control circuit means comprising:
means (10, 11) for comparing an output voltage of said full wave rectifier circuit means (8) with a reference voltage and for generating a control signal when said output voltage of said full wave rectifier circuit means exceeds a given voltage level; and
delay means (9, 12) coupled to said comparing means and responsive to said control signal for generating a trigger signal with a predetermined delay after generation of said control signal;
said trigger signal being coupled to said control electrode of said controlled rectifier means (7).

2. A voltage stabilizing device according to claim 1 wherein said controlled rectifier means (7) comprises a silicon controlled rectifier.

3. A voltage stabilizing device according to claim 1 wherein said delay means comprises an RC circuit including a resistor (9) coupled to a capacitor (12).

4. A voltage stabilizing device according to claim 3 wherein said comparing means comprises a resistor (11) coupled in series with a constant voltage element (10), said resistor (9) of said RC circuit being coupled in series with said comparing means, the series combination of said resistor (9) of said RC circuit and said comparing means being coupled across the output terminals of said full wave rectifier circuit means (8).

5. A voltage stabilizing device according to claim 4 wherein said control signal is obtained at a junction between said resistor (9) of said RC circuit and said comparing means.

6. A voltage stabilizing device according to claim 5 wherein said constant voltage element (10) comprises a Zener diode.

7. A voltage stabilizing device according to claim 5 wherein said capacitor (12) of said RC circuit is coupled in parallel with said resistor (9) of said RC circuit, said trigger signal being obtained across said capacitor (12).

8. A voltage stabilizing device according to claim 5 wherein said gate control circuit means further includes a transistor (13) coupled between said junction of said comparing means (10, 11) and said resistor (9) of said RC circuit, and the control electrode of said controlled rectifier means (7).

9. A voltage stabilizing device according to claim 8 comprising a diode (14) coupling the output electrode of said transistor (13) to said control electrode of said controlled rectifier means (7).

10. A voltage stabilizing device according to claim 8 wherein said resistor (9) and said capacitor (12) of said RC circuit are coupled together in parallel, said parallel coupled resistor and capacitor being coupled across the base and emitter electrodes of said transistor (13), the collector electrode of said transistor (13) being coupled to said control electrode of said controlled rectifier means (7).

11. A voltage stabilizing device according to claim 5 further comprising a diode ($D_1$) coupled in series with said resistor of said RC circuit and said comparing means.

12. A voltage stabilizing device according to claim 1 wherein said gate control circuit means is connected between the control electrode and anode electrode of said controlled rectifier means, and includes a rectifier for rectifying an alternating current voltage produced from said alternating current generator; said comparing means being coupled to said rectifier for producing said control signal when the rectified voltage output of said rectifier exceeds said reference voltage which corresponds to when the alternating current voltage exceeds a predetermined value; and an amplifying means coupled to said delay means for applying said trigger signal to the control electrode of said controlled rectifier means; thereby phase controlling a conducting condition of said controlled rectifier means and stabilizing an effective value voltage applied to a load device connected to the magneto alternating current generator.

13. A voltage stabilizing device according to claim 1 wherein said resistor (9) and said capacitor (12) are coupled together in parallel.

14. A method for stabilizing the effective output value of an alternating current voltage provided by a magneto alternating current generator substantially at or below a predetermined level, comprising:

connecting a rectifying means in parallel with a magneto alternating current generator for rectifying an alternating current output voltage of the magneto alternating current generator;

connecting a controlled rectifier in parallel with both said magneto alternating current generator and said rectifying means;

comparing the rectified voltage with a reference voltage;

detecting the rising of the alternating current output voltage above said predetermined level by detecting when the output voltage derived by said comparing step exceeds a given value and generating a control signal when said given value is exceeded; and generating a trigger signal responsive to said control signal and delayed in time relative to said control signal by a given amount and controlling said controlled rectifier means with said trigger signal to cause said controlled rectifier means to conduct for given periods of time which begin with a lag relative to when said given value is exceeded in said comparing step, to thereby selectively short out both the output of said magneto alternating current generator and the output of said rectifying means.

* * * * *

UNITED STATES PATENT AND TRADEMARK OFFICE
CERTIFICATE OF CORRECTION

PATENT NO. : 4,028,611
DATED : June 7, 1977
INVENTOR(S) : Minoru TASHIRO et al

It is certified that error appears in the above-identified patent and that said Letters Patent are hereby corrected as shown below:

Change the designation of the Japanese priority application to --48-96656--.

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*

UNITED STATES PATENT OFFICE
CERTIFICATE OF CORRECTION

Patent No. 4,028,611  Dated June 7, 1977

Inventor(s) Minoru Tashiro et al

It is certified that error appears in the above-identified patent and that said Letters Patent are hereby corrected as shown below:

On the Title page, in item (75) "Yokohama" should read

-- Yokohama-shi --.

Signed and Sealed this

Twenty-ninth Day of November 1977

[SEAL]

Attest:

RUTH C. MASON  
Attesting Officer

LUTRELLE F. PARKER  
Acting Commissioner of Patents and Trademarks